(12) United States Patent
Chamberlain et al.

(10) Patent No.: US 9,367,930 B2
(45) Date of Patent: Jun. 14, 2016

(54) METHODS AND SYSTEMS FOR DETERMINING FISH CATCHES

(75) Inventors: Glenn Chamberlain, Fairhaven, MA (US); Brian J. Rothschild, New Bedford, MA (US)

(73) Assignee: University of Massachusetts, Fall River, MA (US)

(*) Notice: Subject to any disclaimer, the term of this patent is extended or adjusted under 35 U.S.C. 154(b) by 523 days.

(21) Appl. No.: 13/819,852

(22) PCT Filed: Aug. 31, 2011

(86) PCT No.: PCT/US2011/049869
§ 371 (c)(1),
(2), (4) Date: May 14, 2013

(87) PCT Pub. No.: WO2012/030899
PCT Pub. Date: Mar. 8, 2012

(65) Prior Publication Data
US 2013/0223693 A1 Aug. 29, 2013

Related U.S. Application Data (60) Provisional application No. 61/378,615, filed on Aug. 31, 2010.

(51) Int. Cl.
*G06T 7/60* (2006.01)
*A01K 73/10* (2006.01)
*G06T 7/00* (2006.01)

(52) U.S. Cl.
CPC ............... *G06T 7/602* (2013.01); *A01K 73/10* (2013.01); *G06T 7/0004* (2013.01); *G06T 2207/10012* (2013.01); *G06T 2207/30128* (2013.01)

(58) Field of Classification Search
USPC .................................................. 382/100, 110
See application file for complete search history.

(56) References Cited

U.S. PATENT DOCUMENTS 4,963,035 A * 10/1990 McCarthy ............... A22C 25/04
209/586
6,222,449 B1 * 4/2001 Twining .................. A01K 97/00
177/148
(Continued)

FOREIGN PATENT DOCUMENTS

EP 0373614 A2 6/1990
WO WO 2009008733 A1 * 7/2008 ............... G06K 9/00

OTHER PUBLICATIONS

Rosen et al. "DeepVision: a stereo camera system provides highly accurate counts and lengths of fish passing inside a trawl" Can. J. Fish. Aquat. Sci. 70: 1456-1467 (2013) pp. 1456-1467.*
(Continued)

*Primary Examiner* — Chan Park
*Assistant Examiner* — Mia M Thomas
(74) *Attorney, Agent, or Firm* — Burns & Levinson LLP; Orlando Lopez (57) ABSTRACT

The present disclosure is directed towards determining, at sea, the respective weights of fish species that are part of a fish catch. By way of the present disclosure, images of a fish catch are taken using triangulation techniques involving stereophotogrammetry. According to one embodiment, a method for estimating a total weight of a fish catch includes receiving a fish catch on a fishing vessel and capturing images of the fish catch. From the images, fishes are identified and the species to which the corresponding fishes belong are also identified. Using the images, lengths of the identified fishes as well as the total volume occupied by the fish catch are determined, which can be used to estimate the total weight of the fish catch.

15 Claims, 6 Drawing Sheets

(56) References Cited

U.S. PATENT DOCUMENTS

| | | | | |
|---|---|---|---|---|
| 6,256,401 | B1* | 7/2001 | Whited | G06K 9/00 382/110 |
| 6,720,949 | B1* | 4/2004 | Pryor | A63F 13/02 345/156 |
| 6,993,461 | B1* | 1/2006 | Boussac | G06T 17/10 345/421 |
| 7,254,483 | B2* | 8/2007 | Squires | G06Q 10/10 702/2 |
| 7,669,369 | B2* | 3/2010 | Henry | E06B 1/70 49/408 |
| 7,901,873 | B2* | 3/2011 | Nicholson | A61B 5/055 435/25 |
| 9,195,370 | B1* | 11/2015 | Hlatky, Jr. | G06F 3/0482 |
| 2001/0048468 | A1* | 12/2001 | Fantone | A01K 79/00 348/81 |
| 2003/0056419 | A1* | 3/2003 | Squires | G06Q 10/10 43/4.5 |
| 2004/0148844 | A1* | 8/2004 | Hawn | A01K 91/08 43/27.4 |
| 2008/0000140 | A1* | 1/2008 | Mitchell | A01K 85/01 43/42.06 |
| 2008/0137104 | A1* | 6/2008 | Lillerud | A01K 61/001 356/627 |
| 2008/0140234 | A1* | 6/2008 | Shafter | G06Q 10/10 700/91 |
| 2009/0100739 | A1* | 4/2009 | Resch | A01K 77/00 43/12 |
| 2009/0184715 | A1* | 7/2009 | Summerfield | G01V 3/12 324/334 |
| 2009/0251542 | A1* | 10/2009 | Cohen | H04N 7/181 348/148 |
| 2011/0009694 | A1* | 1/2011 | Schultz | A61B 1/00052 600/109 |
| 2012/0095458 | A1* | 4/2012 | Cybulski | A61B 1/00071 606/41 |
| 2012/0306644 | A1* | 12/2012 | Campbell | G06K 9/00 340/539.13 |
| 2013/0331146 | A1* | 12/2013 | Wills | G06Q 50/02 455/556.1 |
| 2014/0078409 | A1* | 3/2014 | Wang | G02B 23/22 349/5 |
| 2014/0168411 | A1* | 6/2014 | Ledet | A22C 29/023 348/89 |
| 2014/0192247 | A1* | 7/2014 | Cheong | G06F 3/011 348/333.11 |
| 2014/0270395 | A1* | 9/2014 | Jones | G06T 7/602 382/110 |
| 2015/0049919 | A1* | 2/2015 | Humal | A01K 47/06 382/110 |
| 2015/0228062 | A1* | 8/2015 | Joshi | G06Q 50/12 382/110 |

OTHER PUBLICATIONS

Chang et al. "How to collect verifiable length data on tuna from photographs: an approach for sample vessels" ICES Journal of Marine Science, 66: 907-915.*

Lambert et al. "Evaluation of a Photographic Technique for Estimating Body Size in Lizards From a Distance" Herpetological Conservation and Biology 7(1):83-88. Submitted: Jul. 15, 2011; Accepted: Mar. 2, 2012; Published: May 6, 2012.*

Svellingen et al. "Automatic species recognition, length measurement and weight determination, using the CatchMeter computer vision system." International Council for CM 2006/N:03 Exploration of the Sea: pp. 1-10.*

Cadrin et al. "The utility of image processing techniques for morphometric analysis and stock identification" Fisheries Research 43 (1999) 129-139.*

Guth, P. "Drainage basin morphometry: a global snapshot from the shuttle radar topography mission" European Geosciences Union-Hydrol. Earth Syst. Sci., 15, 2091-2099, 2011 www.hydrol-earth-syst-sci.net/15/2091/2011/ doi:10.5194/hess-15-2091-2011, pp. 1-9.*

Rea et al. "Geostatistical analysis of ground penetrating radar data: A means of describing spatial variation in the subsurface" Water Resources Research, vol. 34, No. 3, pp. 329-339 (Mar. 1998).*

Fish et al. "Functional correlates of differences in bone density among terrestrial and aquatic genera in the family Mustelidae (Mammalia)"; Zoomorphology (1991) 110: pp. 339-345.*

Pan et al. "Prediction of shelled shrimp weight by machine vision" Journal of Zhejiang University Science B ISSN 1673-1581 (Print) pp. 589-594; Aug. 2009.*

Luzuriaga et al. "Analysis of Visual Quality Attributes of White Shrimp by Machine Vision" vol. 62, No. 1, 1997—Journal of Food Science, pp. 1-7.*

Chang, S.-K. et al. How to collect verifiable length data on tuna from photographs: an approach for sample vessels. ICES Journal of Marine Science, 907-915 (2009).

Williams, K. et al. Use of stereo camera systems for assessment of rockfish abundance in untrawlable areas and for recording pollock behavior during midwater trawls. Fish. Bull. 108:352-362 (2010).

Okamoto, M. et al. Fundamental Study to Estimate Fish Biomass around Coral Reef Using 3-dimensional Underwater Video System. Oceans 2000 MTS/IEEE Conference 2:1389-1392 (2000).

Martinez-De Dios, J. R. et al. Computer vision and robotics techniques in fish farms. Robotica 21:233-243 (2003).

Beddow, T. A. et al. Predicting salmon biomass remotely using a digital stereo-imaging technique. Aquaculture 146:189-203 (1996).

International Search Report dated Jan. 12, 2012 for PCT/US11/49869.

* cited by examiner

METHODS AND SYSTEMS FOR DETERMINING FISH CATCHES

CROSS-REFERENCE TO RELATED APPLICATIONS

This application is a U.S. national stage application under 35 U.S.C. 371 of co-pending International Application No. PCT/US11/49869 filed on Aug. 31, 2011 and entitled METHODS AND SYSTEMS FOR DETERMINING FISH CATCHES, which in turn claims priority to U.S. Provisional Patent Application No. 61/378,615 filed on Aug. 31, 2010, both of which are incorporated by reference herein in their entirety for all purposes.

BACKGROUND OF THE INVENTION

Recently there has been an increase in dialogue concerning the need for improved methods of gathering information on both kept and discarded commercially important species. Management decisions are currently based on information largely gathered by established federal surveys and observer programs, which are costly to maintain. Under past management plans, fisheries were managed under a DAS (Days At Sea) system. The DAS system allocates a certain number of fishing days to each vessel over the course of a year. When a vessel uses up its allocation of days, it can either cease operations until the following year or purchase additional fishing days from idle vessels. The DAS management strategy has come under scrutiny in recent years due to safety concerns and other issues.

The new strategy which has been proposed is to move towards managing fisheries through sector units. At this time there are a number of successful sectors in existence in the New England region of the US. Sectors, a cooperative-based catch share system, operate by organizing a number of fishing vessels into a unit. This unit of vessels is then given a share of the total catch for a certain suite of species. Under proposed plans, it is then the responsibility of the manager of each sector to divide the catch among member vessels and account for both kept and discarded catch. This requirement has resulted in demand for new, cost-effective, and reliable methods to collect and analyze data. The volume of data gathered by federal programs depends upon funding for the observer program as required by the Endangered Species Act and Magnuson-Stevens Fishery Conservation and Management Act. Data volume also varies from year to year depending on the fishery. For example, requirements can result in as little as 5% of all trips being monitored for certain fisheries. Primary sources of data for unobserved fishing trips are vessel trip reports and dealer reports which can vary in accuracy. Proposed guidelines for sectors require fishermen to develop plans to record catch information and pay a significant portion of the cost of the data collection. The cost of implementing a reliable survey or paying for observers is often prohibitive. Electronic monitoring has been suggested as an alternative. Past electronic monitoring programs have utilized a combination of fixed cameras and human technicians. The application of electronic monitoring to trawl fisheries is a relatively unexplored concept. These programs have met with varying degrees of success and many were applicable only to specific gear types or fisheries. The purpose of many of these programs was to monitor fishing activity rather than catch estimation. There have been suggestions that electronic monitoring use in sector management will need to expand to include estimates of length and weight. To replicate data collection tasks completed by observers, electronic monitoring systems will be required to estimate the weight of discarded species.

Accordingly, there is a need to provide electronic monitoring methods and systems for use in sector management that include estimates of length and weight of fish being caught.

SUMMARY OF THE INVENTION

The present disclosure is directed towards determining, at sea, the respective weights of fish species that are part of a fish catch. By way of the present disclosure, images of a fish catch are taken using triangulation techniques involving stereo photogrammetry.

According to one embodiment, a method for estimating a total weight of a fish catch includes receiving a fish catch on a fishing vessel and capturing images of the fish catch. From the images, fishes are identified and the species to which the corresponding fishes belong are also identified. Using the images, lengths of the identified fishes as well as the total volume occupied by the fish catch are determined, which can be used to estimate the total weight of the fish catch.

According to another embodiment, a fishing vessel is equipped with an image capture system that can capture images of a fish catch, and a fish catch weight measurement system that can estimate the total weight of the fish catch using the images captured by the image capture system. In various embodiments, the images are captured using photogrammetry.

For a better understanding of the present teachings, together with other and further needs thereof, reference is made to the accompanying drawings and detailed description.

BRIEF DESCRIPTION OF THE DRAWINGS

The present disclosure is illustratively shown and described in reference to the accompanying drawing in which.

DETAILED DESCRIPTION

Technologies herein are directed towards determining, at sea, the respective weights of fish species that are part of a fish catch. By way of the present disclosure, images of a fish catch are taken using triangulation techniques involving stereo photogrammetry. From the images of the fish catch, individual fish are identified and a characteristic length associated with the individual fish is measured. Using the measured characteristic length, a total fish length can be determined, and upon determining the total fish length, an estimated weight of the individual fish can be determined based on historical average weight data of fish of a particular species. The proportions of the different types of fish in the fish catch are estimated using the images of the fish catch. Next, the volume of the fish catch is estimated based on the images, and the total weight of each fish species of the fish catch is calculated upon determining an estimated number of fish in the fish catch based on the volume of the fish catch.

The present disclosure will be more completely understood through the following description, which should be read in conjunction with the attached drawings. In this description, like numbers refer to similar elements within various embodiments of the present disclosure. Within this description, the claims will be explained with respect to embodiments. The skilled artisan will readily appreciate that the methods and systems described herein are merely exemplary and that variations can be made without departing from the spirit and scope of the disclosure.

Figure 1A:
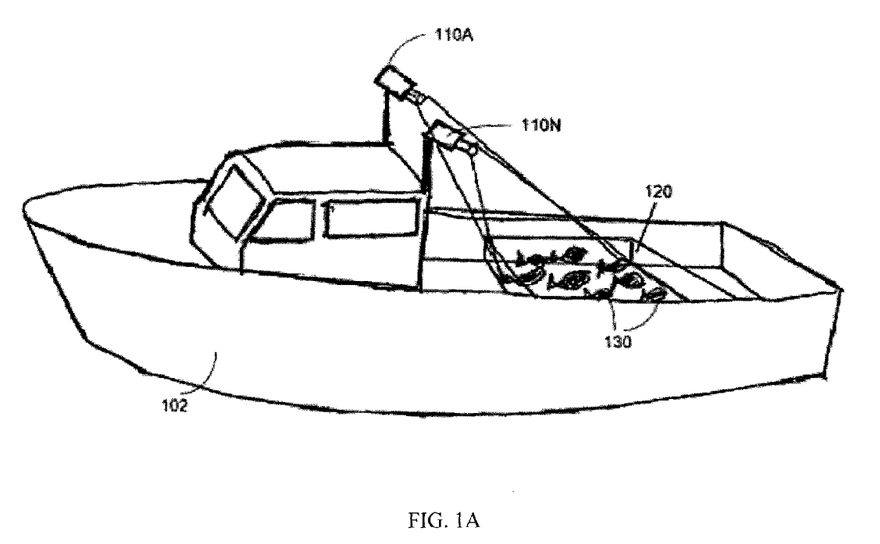
FIG. 1A illustrates a fishing vessel equipped with an image capturing system and a fish catch weight measurement system according to various embodiments of the present disclosure.

Referring now to FIG. 1A, a fishing vessel equipped with an image capturing system and a fish catch weight measurement system according to various embodiments of the present disclosure is shown. The fishing vessel 102 can be any type of fishing vessel, including but not limited to, trawlers, seiners, line vessels, or any other water vehicle configured to catch fish.

The fishing vessel 102 may include a checker pen 120 or an area on the vessel 102 where fish catch 130 captured from the water is placed. The checker pen 120 may be walled, in which case, the volume of the fish catch 130 may be partially defined by the walls of the checker pen 120. In other embodiments, the checker pen 120 may not be walled, in which case, the fish catch 130 can form any polygonal shape when placed in the checker pen 120.

As briefly described above, the present disclosure provides techniques for determining the weight of the fish catch using stereo-photogrammetry. Photogrammetry is the practice of determining the geometric properties of objects from photographic images. Stereo-photogrammetry involves estimating the three-dimensional coordinates of points on an object, which are determined by measurements made in two or more photographic images taken from different positions.

Accordingly, the fishing vessel 102 may be equipped with an image capturing system that includes one or more image recording devices, such as video recorders or cameras 110A-110N, generally referred to herein as cameras 110, and an actuation device 112 that causes the cameras 110 to capture still images of the fish catch simultaneously. In the present disclosure, the cameras 110 may be set up to capture images of the checker pen 120 from different positions. In one embodiment, the cameras 110 may be implemented as Canon Rebel XS cameras, commercially available from CANON U.S.A., Lake Success, N.Y. In various embodiments, the cameras may be digital Single-Lens Reflex (SLR) cameras.

It should be appreciated that although the images captured by the cameras 100 may be still images, other embodiments may utilize video cameras that capture synchronized video recordings of the checker pen 120. There are several benefits of using digital SLR cameras as opposed to digital video cameras or generic digital cameras. SLR cameras can take a greater number of photos in a shorter time than off-the-shelf digital still cameras, function well in low light conditions, and have the ability to interface with a number of different lenses and accessories. SLR cameras also provide greater resolution than many digital still cameras and video cameras, resulting in improved photogrammetric measurement precision. When compared with video, images taken by SLR cameras require less storage space, less time to analyze as there are fewer images, and result in minimal invasion of privacy, which is a consideration when using technology on board fishing vessels.

The actuation device 112 may be a clicker, which when triggered, causes the cameras 110 to capture an image of the checker pen 120. In some embodiments, the cameras 110 may take a photograph of the checker pen 120 upon receiving an actuation signal from the actuation device 112. The cameras can be actuated remotely using a small remote, which may be implemented as a Pclix remote, commercially available from 1017 Visual Effects Inc, Canada. In one embodiment, the Pclix remote is connected directly to the cameras 110, and is triggered by using a battery pack. It should be appreciated that the cameras 110 have to be synchronized to accurately identify the three-dimensional coordinates of points on an object. If the cameras 110 are not actuated at the same time, then objects in an image may not remain in the same position, resulting in faulty measurements due to motion parallax.

In some embodiments, to be able to capture a number of images over the duration of a fishing trip, the cameras 102 are left on and allowed to go into "sleep" mode. Triggering the actuation device 112 causes the cameras 102 to exit from the sleep mode and capture images. In various embodiments, the actuation device 112 may be configured to actuate using sensors. When the sensors, including but not limited to light, temperature, or pressure sensors, sense a certain condition, such as the presence of fish catch 130 in the checker pen 120, the sensors may cause the actuation device 112 to actuate the cameras 110. In addition, the actuation device 112 may be configured to be triggered after a fixed periodic time interval.

The accuracy of the weight measurement system relies on the accuracy of the measurements made from the images captured by the cameras. As such, the quality of the images captured by the cameras 110 can influence the accuracy of the fish catch weight measurement system. To enable the cameras 110 to capture high quality images, the cameras 110 may be securely mounted on the fishing vessel 102. Because even small movements of the housings can disrupt the calibration of the cameras 110, vibrations resulting from the engine of a fishing vessel are minimized as much as possible. Vibrations also have the potential to blur photos, rendering them unusable. To reduce the possibility of image blurring, the cameras can be mounted on vibration absorption plates to absorb vibrations. In addition, the cameras may be enclosed in respective housings to prevent the cameras 110 from being exposed to external elements, including but not limited to, water in the form of rain or from the sea. The housings and the cameras 110 may also be secured to a section of the vessel where vibrations are less pronounced.

In various embodiments, the cameras 110 can be secured to a base in their respective housings such that one end of the lens rests firmly against a glass surface of a front port of the housing to reduce the risk of any camera movement. Furthermore, the cameras 110 need to be calibrated with respect to one another and the checker pen so as to enable triangulation, which will enable the weight measurement system to calculate the volume and weight of the fish catch. Part of the calibration process requires the cameras 110 to be separated from one another to maintain the convergence distance, which is the distance between the respective cameras and a point where the optical axes of the cameras 110 intersect. The cameras 110 can be rotated on the base to achieve the necessary angle and base separation. However, any rotation of the cameras 110 or housings will require re-calibration of the cameras 110 prior to making any estimates.

As briefly mentioned above, stereo-photogrammetry involves estimating the three-dimensional coordinates of points on an object, which are determined by measurements made in two or more photographic images taken from different positions. To obtain a 3-D measurement from a 3-D image, the intersection of the rays of each camera are used to create points used in measurement on an object of interest, such as a fish or fish catch. The point of intersection, together with the rays from the cameras 110, is used to triangulate the location of a given point on the object of interest in 3-D. To be able to determine the location of the point on the object of interest, the distance from the cameras 110 to the object and the angle at which the cameras are separated must be known. These known distances are used to estimate the location of a point or target on the surface of an object. To determine these distances, each image is resected. Resecting is accomplished by identifying a number of identical points in each of the two images gathered by the pair of cameras used. The X, Y, and Z planes also must be defined to properly resect each image. Defining the X, Y, and Z planes allows the orientation of the cameras to be determined. A bundle adjustment may then be used to complete the resection of each image and orient the cameras 110. A bundle adjustment makes use of information gathered during the calibration of the cameras used in the photogrammetric system before resecting the images and orienting the cameras 110.

It should be appreciated that cameras used in photogrammetry need to be calibrated as most cameras are not without built-in distortions, including but not limited to, lens distortions. Calibration of a stereo-pair of cameras accounts for these distortions and allows the user to adjust the cameras accordingly.

As part of the calibration process, the cameras 110 may need to be focused to conform to the distance from the cameras 110 to the fish catch being photographed. In addition, the cameras 110 are then calibrated to determine parameters of the cameras 110. These parameters include, but are not limited to, the internal orientation of the cameras, principal distance and point location, lens distortions, sensor pixel spacing, and the orientation of the cameras to one another. In various embodiments, the cameras 110 can be calibrated using a calibration package, including but not limited to, a calibration package called CAL manufactured by SeaGIS Pty. Ltd. of Australia, which includes a software application, a calibration cube for calibrating the cameras 110 to a specific distance, and a scale bar for checking the quality of the calibration and for verifying that the calibration has remained stable during and following use of the cameras 110. It should be understood that by calibrating the cameras 110, certain properties of each camera, including but not limited to, the focal length and lens distortion model can be determined and utilized to help accurately measure aspects of the fish catch captured in the images.

Figure 1B:
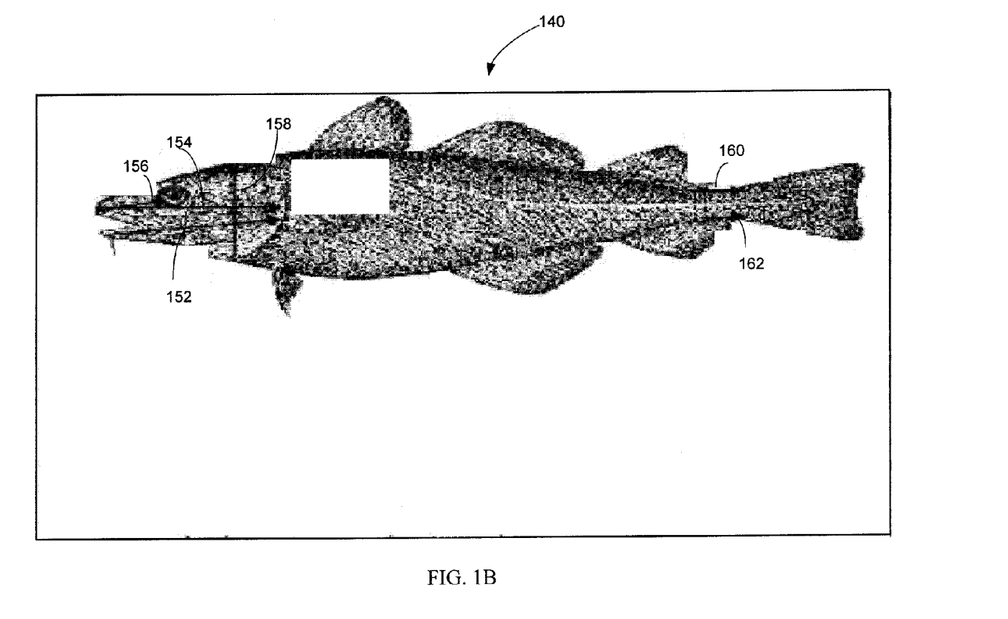
FIG. 1B illustrates an exemplary fish with various characteristic lengths according to various embodiments of the present disclosure.

Referring now to FIG. 1B, a fish with various characteristic lengths is shown. As briefly described, the characteristic lengths of a fish have been determined to be correlated to the total length of the fish, which in turn has been determined to be correlated to the weight of the fish. As such, by determining a characteristic length of the fish, the weight of the fish can be estimated. The fish 140 shown in FIG. 1B shown various characteristic lengths, such as the lower jaw to operculum 152, the upper jaw to operculum 154, the upper jaw to eye 156, the head depth 158, the upper peduncle 160 and the lower peduncle 162. Other characteristic lengths, including but not limited to, the inter-orbital length, that correlate to the total length of the fish may also exist but are not shown in FIG. 1B. It should be appreciated that the characteristic length may also include the total length of the fish.

It has been determined that some characteristic lengths have stronger correlations to total length than others and these vary on a species to species basis. For many species, the posterior region of the fish contain less desirable characteristic lengths to determine total length and weight of a fish. It has also been determined that the upper jaw to operculum 154 may provide relatively accurate estimates of the actual total length and weight of a fish relative to other characteristic lengths. The following table illustrates a calculated $r^2$ value from regression of natural log total length on the natural log of each of the characteristic lengths for five different species.

TABLE 1

$r^2$ value from regression of natural log total length on the natural log of each on the natural log of each of the characteristic lengths for five different species.

| Characteristic Length | Atlantic cod | Haddock | Pollock | Redfish | Spiny dogfish |
|---|---|---|---|---|---|
| Upper Jaw to Operculum | 0.96 | 0.89 | 0.91 | 0.90 | — |
| Lower Jaw to Operculum | 0.93 | 0.77 | 0.91 | 0.63 | — |
| Upper Jaw to Eye | 0.87 | 0.80 | 0.90 | 0.44 | 0.25 |
| Head Depth | 0.58 | 0.42 | 0.72 | 0.72 | — |
| Inter-Orbital distance | 0.58 | 0.81 | 0.85 | 0.67 | 0.29 |
| Upper Peduncle | 0.40 | 0.34 | 0.42 | 0.20 | 0.19 |
| Lower Peduncle | 0.23 | 0.16 | 0.37 | 0.80 | — |
| Upper Jaw to Pre-Operculum | — | — | — | 0.80 | — |
| Fork Width | — | — | — | — | 0.38 |
| Upper Jaw to First Gill | — | — | — | — | 0.46 |
| Upper Jaw to Last Gill | — | — | — | — | 0.59 |
| Upper Jaw to Second Gill | — | — | — | — | 0.7 |

As indicated in Table 1, the upper jaw to operculum characteristic length has the highest correlation value with total length for the Atlantic cod, haddock, pollock, and redfish species. For the spiny dogfish, the upper jaw to second gill characteristic length demonstrated the strongest correlation to total length.

It has been determined that regressing total length on a particular characteristic length may provide a graph that has a slope and intercept, which can be used to a regression equation for the particular characteristic length. These results can be seen for each species and characteristic lengths in Tables 2a-d. For instance, it has been determined that the total length may be an approximately linear function of head depth. A summary of the regression output for all species can be seen in Tables 2a-d.

TABLE 2a

Regression summary for Atlantic cod, all characteristic lengths.

| Predictor Length | Intercept (95% CL) | Slope (95% CL) | $\hat{r}2$ | Model Significance p-value | Shapiro |
|---|---|---|---|---|---|
| Upper Jaw to Operculum | 1.55 (1.34-1.77) | 0.94 (0.87-1.02) | 0.96 | <.001 | 0.31 |
| Lower Jaw to Operculum | 1.72 (1.48-1.98) | 0.9 (0.81-0.99) | 0.93 | <.001 | 0.56 |
| Upper Jaw to Eye | 2.32 (2.06-2.59) | 1.01 (0.87-1.16) | 0.87 | <.001 | 0.20 |
| Head Depth | 2.61 (2.11-3.11) | 0.79 (0.55-1.04) | 0.58 | <.001 | 0.06 |
| Inter-Orbital Distance | 3.09 (2.74-3.45) | 0.69 (0.48-0.91) | 0.58 | <.001 | 0.19 |
| Upper Peduncle | 3.86 (3.69-4.02) | 0.39 (0.22-0.56) | 0.40 | <.001 | 0.41 |
| Lower Peduncle | 3.8 (3.54-4.07) | 0.43 (0.15-0.71) | 0.23 | <.001 | 0.94 |

TABLE 2b

Regression summary for haddock, all characteristic lengths.

| Predictor Length | Intercept (95% CL) | Slope (95% CL) | $\hat{R}2$ | Model Significance p-value | Shapiro |
|---|---|---|---|---|---|
| Upper Jaw to Operculum | 1.65 (1.34-1.97) | 0.92 (0.80-1.04) | 0.89 | <.001 | 0.74 |
| Lower Jaw to Operculum | 1.98 (1.55-2.41) | 0.84 (0.66-1.00) | 0.77 | <.001 | 0.79 |
| Upper Jaw to Eye | 2.68 (2.41-2.94) | 0.82 (0.66-0.97) | 0.80 | <.001 | 0.99 |
| Head Depth | 2.88 (2.38-3.38) | 0.61 (0.35-0.87) | 0.42 | <.001 | 0.68 |
| Inter-Orbital Distance | 2.99 (2.79-3.18) | 0.74 (0.61-0.87) | 0.81 | <.001 | 0.13 |
| Upper Peduncle | 3.75 (3.61-3.92) | 0.37 (0.18-0.55) | 0.34 | <.001 | 0.18 |
| Lower Peduncle | 3.93 (3.81-4.04) | 0.23 (0.05-0.41) | 0.16 | <.001 | 0.47 |

TABLE 2c

Regression summary for Pollock, all characteristic lengths.

| Predictor Length | Intercept (95% CL) | Slope (95% CL) | $\hat{R}2$ | Model Significance p-value | Shapiro |
|---|---|---|---|---|---|
| Upper Jaw to Operculum | 1.54 (1.21-1.87) | 0.98 (0.86-1.09) | 0.91 | <.001 | 0.43 |
| Lower Jaw to Operculum | 1.48 (1.14-1.81) | 0.99 (0.87-1.11) | 0.91 | <.001 | 0.94 |
| Upper Jaw to Eye | 2.64 (2.43-2.85) | 0.93 (0.81-1.05) | 0.90 | <.001 | 0.63 |
| Head Depth | 2.26 (1.78-2.74) | 1.06 (0.81-1.31) | 0.72 | <.001 | 0.03 |
| Inter-Orbital Distance | 2.53 (2.25-2.82) | 1.09 (0.91-1.26) | 0.85 | <.001 | 0.89 |
| Upper Peduncle | 3.69 (3.42-3.96) | 0.90 (0.33-0.85) | 0.42 | <.001 | 0.86 |
| Lower Peduncle | 3.80 (3.56-4.04) | 0.49 (0.25-0.72) | 0.37 | <.001 | 0.47 |

TABLE 2d

Regression summary for redfish, all characteristic lengths.

| Predictor Length | Intercept (95% CL) | Slope (95% CL) | $\hat{R}2$ | Model Significance p-value | Shapiro |
|---|---|---|---|---|---|
| Upper Jaw to Operculum | 1.49 (1.25-1.74) | 0.93 (0.81-1.04) | 0.90 | <.001 | 0.25 |
| Lower Jaw to Operculum | 1.68 (1.17-2.19) | 0.83 (0.59-1.07) | 0.63 | <.001 | 00 |
| Upper Jaw to Eye | 3.22 (3.12-3.32) | 0.32 (0.19-0.45) | 0.44 | <.001 | 0.19 |
| Head Depth | 2.17 (1.86-2.48) | 0.68 (0.51-0.84) | 0.72 | <.001 | 0.01 |
| Inter-Orbital Distance | 3.04 (2.93-3.15) | 0.54 (0.39-0.68) | 0.67 | <.001 | 0.86 |
| Upper Peduncle | 3.16 (2.95-3.37) | 0.40 (0.12-0.67) | 0.20 | <.001 | 0.21 |
| Lower Peduncle | 1.40 (1.00-1.80) | 0.89 (0.72-1.06) | 0.8 | <.001 | 0.72 |

TABLE 2d-continued

Regression summary for redfish, all characteristic lengths.

| Predictor Length | Intercept (95% CL) | Slope (95% CL) | $\hat{R}^2$ | Model Significance p-value | Shapiro |
|---|---|---|---|---|---|
| Upper Jaw to Pre-Operculum | 1.86 (1.56-2.15) | 0.86 (0.70-1.02) | 0.80 | <.001 | 0.09 |

The total length of a fish have been regressed on combinations of multiple characteristic lengths to establish prediction equations using multiple regression. Experimentally, it has been determined that the use of multiple regression may also be used to estimate the weight and length of a fish.

It has also been determined experimentally that the weight and volume of a particular species are directly proportional to one another. As such, the weight of the fish increases with increasing volume. Moreover, it has also been determined that the volume and total length of a particular species are also directly proportional to one another.

In various embodiments, linear regression can be used to create prediction equations able to convert the characteristic lengths to total lengths. Regression can also be used to compare known and estimated lengths and weights in analyzing the data. To model the relationship between characteristic lengths and the total length for various species, the characteristic length of a characteristic can be regressed on total length to generate a series of regression equations for each species.

Prior to completing a regression, data can be transformed by taking the natural log of both the total length and the characteristic length. Natural log may be chosen over other logarithmic bases to transform the data to conform to the methods used in the length-weight relationships published in a technical memorandum by the National Oceanic and Atmospheric Administration (NOAA). To assess the significance of each regression and the quality of the regression, the p value and $r^2$ values are used. Confidence limits and prediction limits may also be fitted to the data.

Characteristic lengths can be ranked to aid users in selecting characteristic lengths to use in estimating total length. Rankings can be determined based on the $r^2$ value assigned to each characteristic length as a result of the regression characteristic length rankings may differ by species, as shown in Table 1.

Figure 2:
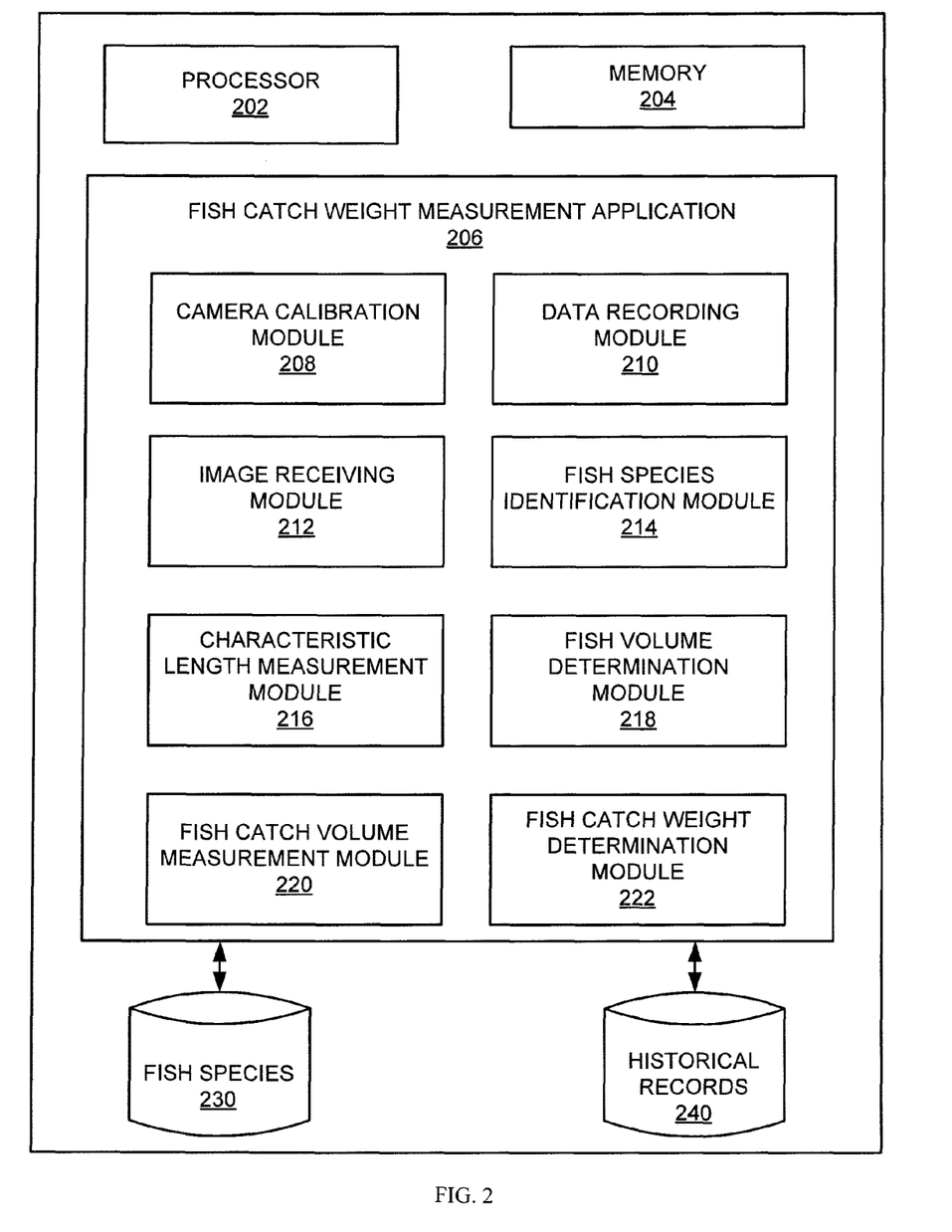
FIG. 2 is a block diagram illustrating the fish catch weight measurement system according to various embodiments of the present disclosure.

Referring now to FIG. 2, the fish catch weight measurement system is shown. The fish catch weight measurement system 200 may be configured to work with the image capture system described above and may be implemented in software, hardware, or a combination of both software and hardware. The fish catch weight measurement system 200 may include a processor 202, a memory 204, a fish catch weight measurement application 210, and one or more data storage locations, such as a fish species database 230, and a historical records database 240.

The fish catch weight measurement application 210 may include one or more software modules, which may be implemented as computer-readable instructions, which when executed by the processor 202, causes the fish catch weight measurement system 200 to determine various properties of the fish catch 130 from the images captured by the image capture system. The fish catch weight measurement application 206 may include a camera calibration module 208, a data recording module 210, an image receiving module 212, a fish species identification module 214 a characteristic length measurement module 216, an fish volume determination module 218, a fish catch volume measurement module 220, and a fish catch weight determination module 222.

The camera calibration module 208 may be configured to calibrate the cameras 110 prior to actual use of the camera for capturing images of the fish catch. As described above, the camera calibration module 208 may be implemented as the software package of the CAL calibration package described above.

The data recording module 210 may be configured to record data being generated by the fish catch weight measurement system 200. This data includes, but is not limited to, data associated with the images captured by the cameras as well as various aspects of the fish catch that is determined by the fish catch weight measurement system 200. In this way, the data may be preserved for historical analysis as well as auditing purposes. In addition, with an improvement in technology, the images may be subjected to further analysis to determine more accurate fish catch data than existing fish catch data.

The image receiving module 212 may be configured to communicate with the cameras 110 such that the images captured by the cameras 110 are transferred to the fish catch weight measurement system 200. In various embodiments, the cameras 110 may be configured to transfer the images in real-time as they are being taken, or in other embodiments, at various times during or after the fishing trip. In addition, upon receiving the images from the cameras 110, the image receiving module 212 may be configured to make the images available to other modules of the fish catch weight measurement application 206 for further analysis or recording.

A fish species identification module 214 may be configured to automatically identify fishes in the image, and further identify the species of fish to which the identified fishes belong. Efforts have been made to determine the species of a fish automatically using photographic images. In one embodiment, watershed segmentation can be used to separate objects within an image by identifying the background and foreground of an image based on pixel colors. However, watershed segmentation functions best when there is a clear separation between objects. As such, cross-correlation may be performed on the images, which compare signals in an image to allow users to identify objects of interest, such as a fish present in the image. Cross-correlation is most effective when an image is of low to moderate complexity. Fast Fourier transforms (FFT) can be used in conjunction with cross-correlation to translate images into relatively easily viewed frequencies. By setting a threshold to images produced by cross-correlation and the FFT, objects in a given image can be clearly outlined. Watershed segmentation utilizes high points (ridge lines) and low points (basins) in images to separate objects whose borders touch in an image, whereby light pixels are treated as high points and dark pixels are treated as low points.

The characteristic length management module 216 may be configured to estimate the length between two points in an image, such as an image of the fish catch 130. In various embodiments, a user may be configured to identify two points associated with a fish in an image using a pointing device, such as a mouse or a stylus, and allow the characteristic length management module 216 to measure the length between the two points. The two points may define the length of a particular characteristic of the fish, such as the such as the lower jaw to operculum 152, the upper jaw to operculum 154, the upper jaw to eye 156, the head depth 158, the upper peduncle 160 and the lower peduncle 162, as shown in FIG. 1B. The purpose of trying to calculate the length of a feature of a particular characteristic of the fish is to determine the total length of the fish. It has been determined that the characteristic length of the fish is correlated to the total length of the fish. Different characteristic lengths associated with different characteristics of a particular fish species have varying correlative relationships with the total length of the particular fish, as discussed above with respect to FIG. 1B and Tables 1 and 2a-d.

As such, as the fish catch 130 is placed in the checker pen 120, images of the fish catch 130 may display the total length of some fishes, but may only display certain characteristics of other fishes in the pile. Accordingly, for fishes whose total length is visible, a user may identify two points that define the total length of the particular fish to calculate the total length of the fish. However, with respect to those fishes for which only certain characteristics are visible, the user may identify the points that define a particular characteristic. The characteristic length measurement module 216 may then determine a characteristic length that separates the two points defining the particular characteristic. According to various embodiments, commercially available software applications, such as PhotoMeasure, manufactured by SeaGIS Pty. Ltd. of Australia, may be utilized by users to determine the length between two points on an image, which with particular reference to the present disclosure, may be two points that define a characteristic length of a fish shown as an object in an image.

In addition, the user may also identify a fish species to which the fish belongs, as well as identify the characteristic being measured by the characteristic length measurement module 216. In various embodiments, the characteristic length measurement module 216 may be configured to automatically identify a fish in an image, indicate a fish species to which the fish belongs, identify points on the fish that define a particular characteristic visible in the image, identify the characteristic being measured, and determine the characteristic length of that particular characteristic. In such embodiments, the fish catch weight measurement system 200 may include an image analysis module that can identify aspects of fish in a pile of fish catch.

Once the characteristic length is measured, the characteristic length measurement module 216 may be configured to determine the total length of the particular fish based on the fish species to which the fish belongs. As described above with respect to FIG. 1B, it has been determined that the total length of a fish of a particular fish species is correlated to the characteristic lengths of one or more characteristics or features of the fish.

In various embodiments, the characteristic length measurement module 216 may have access to the fish species database 230, which stores data associated with various types of fish species. For each fish species, a list of characteristics and the respective correlations between the characteristic length and total length of the fish for that fish species may be provided. Accordingly, the characteristic length measurement module 216 may determine an estimated total length of the fish based on the measured characteristic length of a particular characteristic of the fish. It should be appreciated that the estimated total length of the fish may be more accurate when measuring characteristic lengths of characteristics that have a strong correlation to the total length of the fish than when measuring characteristic lengths of other characteristics that have a weaker correlation to the total length of the fish. it has been determined that for some fish, characteristic lengths associated with characteristics on the anterior portion of the fish body have a stronger correlation to total length relative to characteristic lengths associated with characteristics on the posterior portion of the fish body.

The fish volume determination module 218 may be configured to determine the volume and weight of the identified fish based on the total length of the fish and the species to which the fish belongs. According to embodiments, historical records of fish species maintained by various agencies, including but not limited to, the National Marine Fisheries Services and the NOAA, may have data that correlates the total length of fish of a particular fish species with a corresponding average volume and/or weight for a fish having a particular total length. This data may also be stored in the fish species database 230. As such, the fish volume determination module 218 may be able to determine the volume of the identified fishes based on their corresponding total lengths and the fish species to which they belong. In addition, the fish volume determination module 218 may also be configured to estimate the average volume and weight for each species of fish in the fish catch by averaging the total length of the fish of a particular fish species, and determining a corresponding average fish volume and weight for the average total length. The average volume and weight of a particular fish species may then be provided to the fish catch weight determination module 222 to determine the total weight of each fish species.

In various embodiments, Equation 1 from a version of the NOAA technical memorandum may be used to convert the estimated total length of the identified fish to weight in kilograms.

$$\ln(W) = \ln(a) + b(\ln(L))  \qquad \text{Equation 1}$$

where W is the Individual weight (kg) and L is the Total length (cm)

It should be appreciated that the relationship between total length, weight and volume may vary from species to species, as well as on other factors, such as the time of year the fish are caught, the sex, and the geographic location. Similar equations can be derived from multiple regression lines using multiple characteristic lengths to determine the weight of fish.

The fish catch volume measurement module 220 may be configured to measure the fish catch volume using the images captured by the cameras 110 by processing various points on the images that define the boundaries of the pile of fish catch 130. These points may be provided by a user or may be provided automatically based on the characteristics of pixels relative to adjacent pixels. In one embodiment, a commercially available software application, such as PhotoMeasure, manufactured by SeaGIS Pty. Ltd. of Australia, may be used to measure the volume of the fish catch.

The fish catch weight determination module 222 may be configured to determine the respective weight of each of the fish species that make up the pile of fish catch. To do so, the fish catch weight determination module 222 may determine the respective ratios of the number of fish of a particular fish species to the total number of identified fish for all fish species. In various embodiments, the respective ratios will be assumed to represent the ratio of the fish species that make up the fish catch. Further, the fish catch weight determination module 222 may calculate an average fish species volume for each fish species based on the determined volumes of the identified fish species by adding the volumes of each of the identified fishes of a particular fish species and dividing the sum by the number of identified fish that belong to the particular fish species. In addition, the fish catch weight determination module 222 may determine the total volume occupied by all the identified fishes by adding the volume of each of the identified fishes.

Moreover, the fish catch weight determination module 222 can measure the total fish catch volume using the images captured by the cameras 110 by analyzing various points on the images that define the boundaries of the pile of fish catch 130. These points may be provided by a user or may be identified automatically based on the characteristics of pixels relative to adjacent pixels. Once the total volume of the pile of fish catch is determined, the fish catch weight determination module 222 can determine the total number of fish in each fish species by dividing the total volume of the pile of fish catch by the total volume occupied by the identified fishes and multiplying, to the total number of identified fishes, the result with the respective ratios of the number of identified fish that belong to a corresponding fish species. Finally, the fish catch weight determination module 222 can determine the total weight of each fish species by multiplying the total number of fish for each particular species 130 with an average weight that corresponds to the average total length of the fish of the particular fish species.

It should be appreciated that various assumptions regarding the representation of the fish catch are made as well as the sample of fish identified to determine average weights and lengths. However, it should be appreciated that the accuracy of the fish catch weight determination application 206 can improve if multiple images are analyzed when the checker pen is being loaded and unloaded by fishes of a fish catch. In addition, the fish catch weight determination application 206 may include one or more software modules that may further improve the accuracy of the results generated by the fish catch weight determination application 206.

Figure 3:
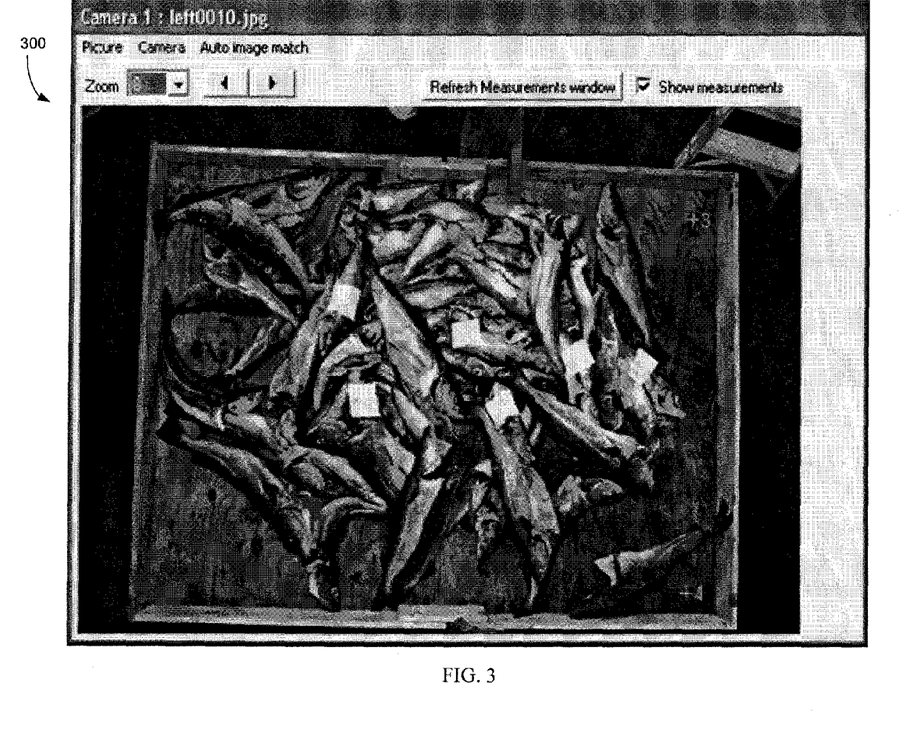
FIG. 3 is a screenshot illustrating a characteristic length measurement module of the fish catch weight measurement system according to various embodiments of the present disclosure.

Referring now to FIG. 3, a screenshot illustrating aspects of the characteristic length measurement module 216 of the fish catch weight measurement system 200 is shown. The screenshot 300 shows the fish catch 130 placed in an exemplary catcher pen, such as the catcher pen 120, as well as lines connecting points that define a various characteristic lengths of various fishes. In various embodiments, the points may be identified by a user of the fish catch weight measurement application 206, or may be automatically identified using image recognition software.

Figure 4:
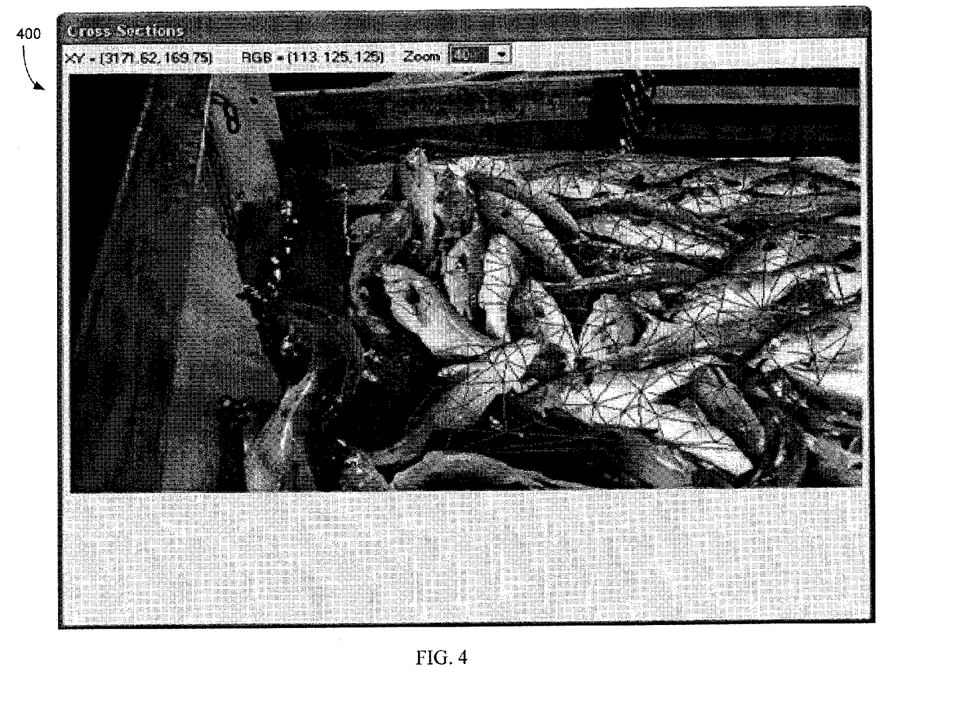
FIG. 4 is a screenshot illustrating a fish catch pile volume measurement module of the fish catch weight measurement system according to various embodiments of the present disclosure.

Referring now to FIG. 4, a screenshot illustrating aspects of the characteristic length measurement module 216 of the fish catch weight measurement system 200 is shown. In particular, the screenshot 400 shows the fish catch 130 placed in an exemplary catcher pen, such as the catcher pen 120, as well as triangles formed by points that define the total volume occupied by the fish catch. In various embodiments, the points may be identified by a user of the fish catch weight measurement application 206, or may be automatically identified using image recognition software for calculating a volume occupied by an object, such as the fish catch 130.

Figure 5:
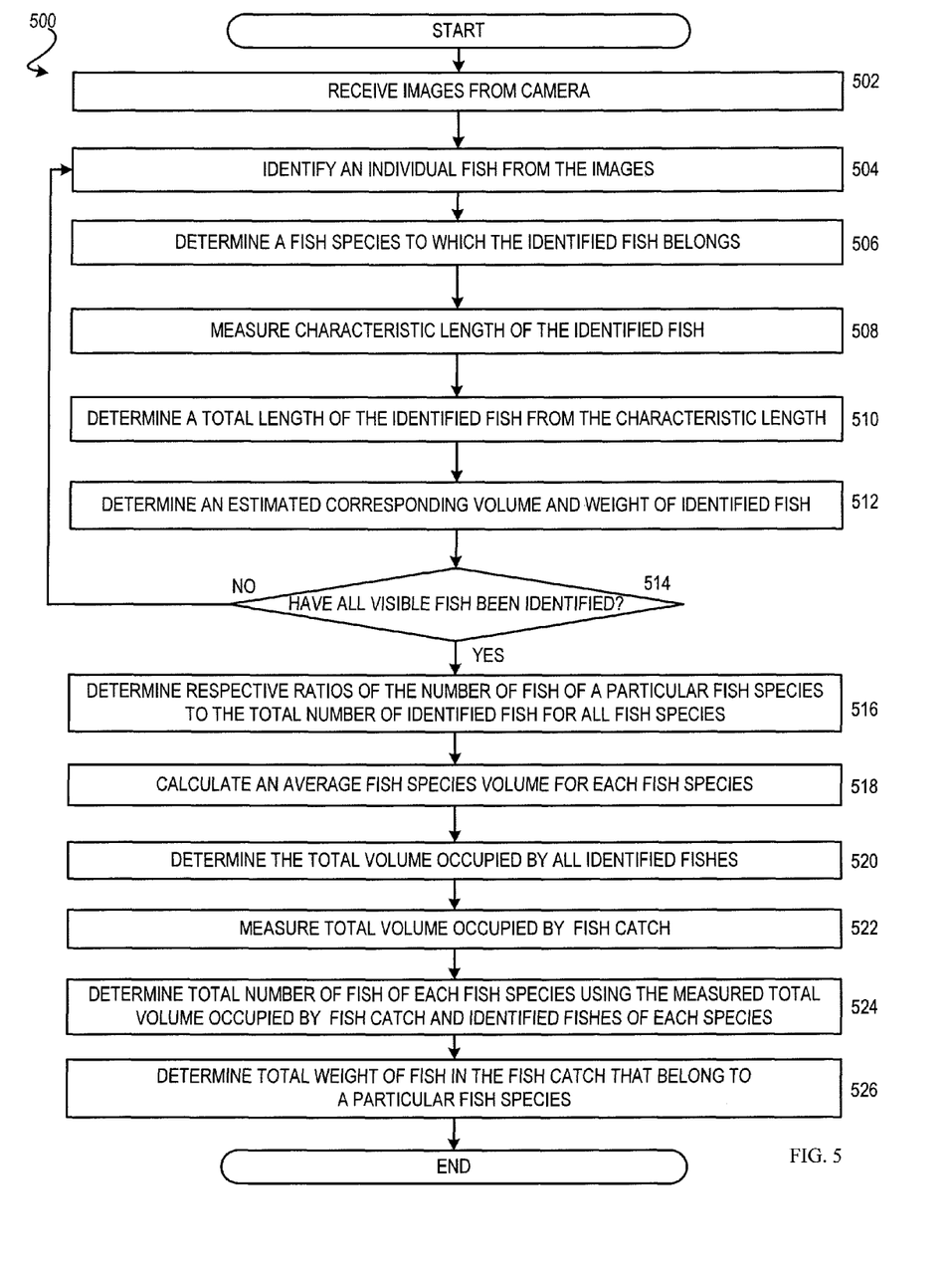
FIG. 5 is a flow diagram of a process for measuring the weight of fish species of a fish catch according to various embodiments of the present disclosure.

FIG. 5 is a flow diagram of a process for measuring the weight of fish species of a fish catch according to various embodiments of the present disclosure. A routine 500 begins at operation 502, where the image receiving module 212 receives one or more images. In various embodiments, the image is may be of a catcher pen 120 which may or may not contain fish catch 130. From operation 502, the routine 500 proceeds to operation 504, where an individual fish is identified from the images. As the fish catch is arranged as a pile of fish, some of the fishes may only partially visible. However, as long as any portion of the fish that corresponds to a measurable characteristic that correlates to the total length of the fish is visible, the fish can be identified. In various embodiments, the fish species identification module 214 may automatically identify the fish using image recognition technologies.

From operation 504, the routine 500 proceeds to operation 506, where the fish species to which the identified fish belongs is determined. In various embodiments, a user may manually identify the species based on the appearance of the fish, or by measuring one or more characteristics of the identified fish. Alternatively, the fish species identification module 214 can automatically identify the species of the identified fish by comparing the image of the fish with previously classified fish images.

From operation 506, the routine 500 proceeds to operation 508, where the characteristic length measurement module 216 measures a characteristic length of a particular characteristic associated with the identified fish. In some embodiments, the characteristic length measurement module 216 may automatically measure the characteristic by identifying points that define the particular characteristic. In other embodiments, a user may indicate points that define the boundaries of the particular characteristic to be measured and the characteristic length measurement module 216 measures the distance or length between the points.

From operation 508, the routine 500 proceeds to operation 510, where the characteristic length measurement module 216 determines a total length of the identified fish from the measured characteristic length. The characteristic length measurement module 216 may access the fish species database 230, which includes tables and data that correlate characteristic lengths of various characteristics of a particular fish species with total lengths of the fish species to determine the total length of the identified fish.

From operation 510, the routine 500 proceeds to operation 512, where the fish volume determination module 218 determines an estimated volume of the identified fish. The fish volume determination module 218 can determine an estimated volume of the identified fish by accessing the fish species database 230, which also includes data that correlates total length of a fish to an average volume of a fish.

From operation 512, the routine 500 proceeds to operation 514, where the fish catch weight measurement application 206 determines if all the visible fish have been identified. As described above, image recognition techniques may be utilized to recognize the fish. In other embodiments, a user may determine if all the visible fish have been identified. If all the visible fish not been identified, the routine 500 returns to operation 504, where another individual fish is identified from the images. If, at operation 514, the fish catch weight measurement application 206 determines that all the visible fish have been identified, the routine 500 proceeds to operation 516, where the fish catch weight determination module 222 can determine the respective ratios of the number of fish of a particular fish species to the total number of identified fish for all fish species. In various embodiments, the respective ratios will be assumed to represent the ratio of the fish species that make up the fish catch.

From operation 516, the routine 500 proceeds to operation 518, where the fish catch weight determination module 222 can the fish catch weight measurement application 222 may calculate an average volume for each fish species based on the determined volumes of the identified fish species by adding the volumes of each of the identified fishes of a particular fish species and dividing the sum by the number of identified fish that belong to the particular fish species.

From operation 518, the routine 500 proceeds to operation 520, where the fish catch weight determination module 222 may determine the total volume occupied by all the identified fishes by adding the volume of each of the identified fishes, as determined in operation 512. From operation 520, the routine 500 proceeds to operation 522, where the fish catch volume measurement module 220 can measure the total fish catch volume using the images captured by the cameras 110 by processing various points on the images that define the boundaries of the pile of fish catch 130. These points may be provided by a user or may be identified automatically based on the characteristics of pixels relative to adjacent pixels.

From operation 522, the routine 500 proceeds to operation 524, where the fish catch weight determination module 222 can determine the total number of fish in each fish species by dividing the total volume occupied by the fish catch determined by the fish catch volume measurement module 220 by the total volume occupied by the identified fishes, as determined in operation 520 and multiplying the result with the respective ratios of the number of identified fish the belong to a corresponding fish species to the total number of identified fishes.

From operation 524, the routine 500 proceeds to operation 526, where the fish catch weight determination module 222 can determine the total weight of each fish species of the fish catch by multiplying the average weight of a fish that belongs to a particular fish species, as determined in operation 512, with the total number of fish that belong to the particular fish species, as calculated in operation 524. From operation 526, the routine 500 ends.

It should be appreciated that there are various advantages in using photogrammetry to estimate the total weight of a fish catch at sea. First, images of catches are permanent records which can be accessed, re-examined, and audited at any time. Images can be revisited to take advantage of any improvements in software or length-weight relationships. This permanence is a feature that traditional methods of gathering data generally do not offer. After a catch has been dumped on the deck of a fishing boat or survey vessel and sorted, the only information about that catch exists on a piece of paper or computer file. Measuring objects from an image is also a non-contact, non-invasive method of gathering data, specially in certain fisheries, where the physical condition of the catch is important to receive a high price. Removing the need to handle fish by another person, such as an observer, is likely to result in greater profits and encourage the use of stereo-photogrammetry.

The present disclosure is illustratively described above in reference to the disclosed embodiments. Various modifications and changes may be made to the disclosed embodiments by persons skilled in the art without departing from the scope of the present disclosure as defined in the appended claims.

What is claimed is:

1. A method for estimating a total weight of a fish catch, comprising:
    capturing images of a fish catch; the fish catch having been received on a fishing vessel;
    wherein capturing images of the fish catch comprises:
        capturing a first image from a first camera; and
        simultaneously capturing a second image from a second camera;
    identifying fishes in the images;
    applying stereo-photogrammetry to obtain characteristics of each fish from the fishes; the first camera and the second camera being configured such that stereo-photogrammetry can be applied;
    identifying, using the characteristics, for each of the fishes, a species to which a corresponding fish belongs;
    determining, from the images, lengths of fishes that are a part of the fish catch;
    determining, from the images, a volume occupied by the fish catch; and
    estimating the total weight of the fish catch based on the lengths of fishes and the volume occupied by the fish catch.

2. The method of claim 1, wherein determining, from the images, lengths of fishes that are a part of the fish catch comprises:
    measuring, from the captured images, a characteristic length associated with the fish;
    determining a species of the identified fish; and
    determining a total fish length based on the measured characteristic length and the species to which the identified fish belongs.

3. The method of claim 2, wherein determining the total fish length based on the measured characteristic length comprises solving a total length determination equation that correlates a particular characteristic length to the total fish length.

4. The method of claim 1, wherein determining, from the images, a volume occupied by the fish catch, comprises:
    identifying, on the captured images, boundaries formed by the fish catch;
    selecting points at the identified boundaries; and
    calculating the volume occupied by the selected points.

5. A method for estimating a total weight of a fish catch, comprising:
    capturing images of a fish catch; the fish catch having been received on a fishing vessel;
    wherein capturing images of the fish catch comprises:
        capturing a first image from a first camera; and
        simultaneously capturing a second image from a second camera;
    identifying fishes in the images;
    applying stereo-photogrammetry to obtain characteristics of each fish from the fishes; the first camera and the second camera being configured such that stereo-photogrammetry can be applied;
    identifying, using the characteristics, for each of the fishes, a species to which a corresponding fish belongs;
    determining, from the images, lengths of fishes that are a part of the fish catch;
    determining, from the images, a volume occupied by the fish catch; and
    estimating the total weight of the fish catch based on the lengths of fishes and the volume occupied by the fish catch; wherein estimating the total weight of the fish catch based on the lengths of fishes and the volume occupied by the fish catch comprises:
        determining respective ratios of a number of fish of a particular species to a total number of identified fishes;
        calculating an average fish species volume;
        determining a total volume occupied by the identified fishes;
        determining a total number of fish in each species from the total volume occupied by the identified fishes and the total volume occupied by the fish catch; and
        determining a total weight of fish that belong to a particular species that are a part of the fish catch.

6. The method of claim 5, wherein calculating an average fish species volume comprises:
    determining a volume of each of the identified fish for a particular species;

adding the volume of each of the identified fish for a particular species to generate a sum; and dividing the sum by the number of identified fish for the particular species.

7. The method of claim 5, wherein determining the total weight of fish that belong to a particular species that are a part of the fish catch comprises:

determining an average weight of a fish of the particular species; and multiplying the average weight of a fish of the particular species to the number of fish of the particular species that are a part of the fish catch.

8. The method of claim 7, wherein determining the average weight of a fish of the particular species comprises accessing a database containing data correlating an average length of a fish to an average weight of a fish of the particular species.

9. A fish catch weight measurement system, comprising:
a first camera;
a second camera, the first camera and the second camera being configured such that stereo-photogrammetry can be applied;
a processor;
a memory coupled to the processor, having computer-executable instructions stored thereon, which when executed by the processor, cause the processor to:
receive images from an image capture system, the image capture system comprising the first camera and the second camera; the image capture system capturing images of a fish catch; the fish catch being received on a fishing vessel;
identify fishes from the images,
apply stereo-photogrammetry to obtain characteristics of each fish from the fishes,
determine, using the characteristics, for each identified fish, a fish species to which the fish belongs,
measure, for each identified fish, a characteristic length of the identified fish,
determine, for each identified fish, a total length of the identified fish from the characteristic length,
determine, for each identified fish, an estimated corresponding volume and weight of the identified fish,
determine a total volume occupied by the fish catch,
determine a total number of fish of each fish species, and
upon determining a total number of fish of each fish species, determine a total weight of fish in the fish catch that belong to a particular fish species.

10. The fish catch weight measurement system of claim 9, wherein the memory having further computer-executable instructions, which when executed by the processor, cause the processor to store the images and associated data in the storage location.

11. A fish catch weight measurement system comprising:
a first camera;
a second camera, the first camera and the second camera being configured such that stereo-photogrammetry can be applied;
a processor;
a memory coupled to the processor, having computer-executable instructions stored thereon, which when executed by the processor, cause the processor to:
receive images from an image capture system, the image capture system comprising the first camera and the second camera; the image capture system capturing images of a fish catch; the fish catch being received on a fishing vessel;
identify fishes from the images,
apply stereo-photogrammetry to obtain characteristics of each fish from the fishes,
determine, using the characteristics, for each identified fish, a fish species to which the fish belongs,
measure, for each identified fish, a characteristic length of the identified fish,
determine, for each identified fish, a total length of the identified fish from the characteristic length,
determine, for each identified fish, an estimated corresponding volume and weight of the identified fish,
determine a total volume occupied by the fish catch,
determine a total number of fish of each fish species, and
upon determining a total number of fish of each fish species, determine a total weight of fish in the fish catch that belong to a particular fish species;
wherein the memory having further computer-executable instructions, which when executed by the processor, cause the processor to:
determine respective ratios of the number of fish of a particular fish species to the total number of identified fish for all fish species,
calculate an average fish species volume for each fish species, and
determine a total volume occupied by the identified fishes.

12. The fish catch weight measurement system of claim 11, wherein the memory having further computer-executable instructions, which when executed by the processor, cause the processor to:
calibrate the image capturing system from which the received images are being captured.

13. An article of manufacture comprising non-transitory computer usable media having computer readable code embodied therein, the computer readable code, which when executed by a processor, causes the processor to:
receive images from an image capture system, the image capture system comprising a first camera and a second camera,
identify fishes from the images,
apply stereo-photogrammetry to obtain characteristics of each fish from the fishes,
determine, using the characteristics, for each identified fish, a fish species to which the fish belongs,
measure, for each identified fish, a characteristic length of the identified fish,
determine, for each identified fish, a total length of the identified fish from the characteristic length,
determine, for each identified fish, an estimated corresponding volume and weight of the identified fish,
determine a total volume occupied by the fish catch,
determine a total number of fish of each fish species, and
upon determining a total number of fish of each fish species, determine a total weight of fish in the fish catch that belong to a particular fish species.

14. An article of manufacture comprising non-transitory computer usable media having computer readable code embodied therein, the computer readable code, which when executed by a processor, causes the processor to:
receive images from an image capture system, the image capture system comprising a first camera and a second camera,
identify fishes from the images,
apply stereo-photogrammetry to obtain characteristics of each fish from the fishes,
determine, using the characteristics, for each identified fish, a fish species to which the fish belongs, measure, for each identified fish, a characteristic length of the identified fish, determine, for each identified fish, a total length of the identified fish from the characteristic length, determine, for each identified fish, an estimated corresponding volume and weight of the identified fish, determine a total volume occupied by the fish catch, determine a total number of fish of each fish species, and upon determining a total number of fish of each fish species, determine a total weight of fish in the fish catch that belong to a particular fish species;

wherein the computer readable code, when executed by the processor, further causes the processor to:

determine respective ratios of the number of fish of a particular fish species to the total number of identified fish for all fish species, calculate an average fish species volume for each fish species, and determine a total volume occupied by the identified fishes.

15. The article of manufacture of claim 14 wherein the computer readable code, when executed by the processor, further causes the processor to:

calibrate the image capturing system from which the received images are being captured.

* * * * *